US012571438B2

(12) United States Patent
Devendorf

(10) Patent No.: US 12,571,438 B2
(45) Date of Patent: Mar. 10, 2026

(54) TURBOSHAFT ENGINE CLUTCH CONFIGURATION

(71) Applicant: General Electric Company, Schenectady, NY (US)

(72) Inventor: Brian Lewis Devendorf, Georgetown, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/198,583

(22) Filed: Mar. 11, 2021

(65) Prior Publication Data

US 2022/0289398 A1      Sep. 15, 2022

(51) Int. Cl.
*F16D 48/08* (2006.01)
*F02C 7/32* (2006.01)
*F02C 7/36* (2006.01)

(52) U.S. Cl.
CPC .............. *F16D 48/08* (2013.01); *F02C 7/32* (2013.01); *F02C 7/36* (2013.01); *F05D 2260/4023* (2013.01); *F16D 2500/3067* (2013.01)

(58) Field of Classification Search
CPC .... F03C 3/113; F02C 7/32; F02C 7/36; F05D 2260/4023; F16D 48/08
See application file for complete search history.

(56) References Cited

U.S. PATENT DOCUMENTS

| | | | |
|---|---|---|---|
| 4,132,064 A | 1/1979 | Kumm | |
| 5,174,109 A * | 12/1992 | Lampe | F02C 7/275 |
| | | | 60/788 |
| 6,312,215 B1 * | 11/2001 | Walker | F01D 21/04 |
| | | | 188/74 |
| 6,786,315 B1 | 9/2004 | Christensen | |
| 7,168,540 B2 | 1/2007 | Kreisl et al. | |
| 8,540,602 B2 | 9/2013 | Ishikawa | |
| 8,561,939 B2 | 10/2013 | Malkin et al. | |
| 8,967,532 B2 | 3/2015 | Vialle | |
| 10,094,235 B2 | 10/2018 | Burns | |
| 10,378,452 B1 | 8/2019 | Barmichev et al. | |
| 2015/0330300 A1 | 11/2015 | Suciu et al. | |
| 2018/0283464 A1 * | 10/2018 | Altamura | F16H 35/10 |
| 2019/0218969 A1 | 7/2019 | Fulleringer et al. | |
| 2019/0264615 A1 * | 8/2019 | Husband | F02C 7/262 |
| 2020/0130853 A1 | 4/2020 | Stuckey | |
| 2020/0284201 A1 * | 9/2020 | Gebhard | F02C 3/10 |
| 2021/0040896 A1 | 2/2021 | Feulner et al. | |

* cited by examiner

*Primary Examiner* — Scott J Walthour
(74) *Attorney, Agent, or Firm* — Dority & Manning, P.A.

(57) ABSTRACT

Gas turbine engines and methods of their operation are provided. For example, a method of operating a gas turbine engine comprises selectively engaging and disengaging an engine clutch disposed between a low speed spool and a rotor assembly of the engine. Engagement or disengagement of the engine clutch is selected based on an operating condition of an aircraft comprising the engine. Further, an inter-spool clutch disposed between the low speed spool and a high speed spool of the engine transitions between engaged and disengaged, disengaging when the high speed spool reaches a speed greater than an operational speed of the low speed spool. Similarly, a gas turbine engine comprises an engine clutch configured to selectively position a low speed spool in operative communication with a rotor assembly and an inter-spool clutch configured to position the low speed spool in operative communication with a high speed spool.

11 Claims, 10 Drawing Sheets

400

402

Selectively engage and disengage engine clutch

404

Engage and disengage inter-spool clutch

TURBOSHAFT ENGINE CLUTCH CONFIGURATION

FIELD

The present subject matter relates generally to gas turbine engines and, more particularly, to gas turbine engine shaft architecture.

BACKGROUND

A gas turbine engine generally includes a turbomachine and a rotor assembly. In the case of a turbofan engine, the rotor assembly may be configured as a fan assembly. The turbomachine generally includes a high pressure, high speed spool and a low pressure, low speed spool. A combustion section receives pressurized air, which is mixed with fuel and combusted within a combustion chamber to generate combustion gases. The combustion gases are provided first to a high speed turbine of the high speed spool, driving the high speed spool, and subsequently to a low speed turbine of the low speed spool, driving the low speed spool. Typically, the rotor assembly is coupled to the low speed spool.

The low speed spool can drive the rotor assembly, e.g., the fan assembly, through a power gearbox, which allows the rotor or fan to be rotated at fewer revolutions per unit of time than the rotational speed of the low speed spool for greater efficiency. Further, the engine may include an accessory gearbox for transferring rotational power of the engine to, e.g., one or more accessory systems mechanically coupled to the accessory gearbox. Typically, the accessory gearbox is located on the high speed spool. However, accessory loads on the high speed spool or core rotor may be variable loads, placing parasitic loads and accessory gearbox/accessory inertia on the core rotor to the detriment of power available from the power turbine or low speed spool, which affects engine transient response.

Accordingly, an engine shaft configuration that facilitates integration of mechanical and electrical power sources and allows the engine to provide electrical power while improving engine transient response would be useful.

BRIEF DESCRIPTION

Aspects and advantages of the invention will be set forth in part in the following description, or may be obvious from the description, or may be learned through practice of the invention.

In one exemplary embodiment of the present subject matter, a method of operating a gas turbine engine is provided. The method comprises selectively engaging and disengaging an engine clutch disposed between a low speed spool and a rotor assembly of the gas turbine engine. Engagement or disengagement of the engine clutch is selected based on an operating condition of an aircraft comprising the gas turbine engine. Further, an inter-spool clutch disposed between the low speed spool and a high speed spool of the gas turbine engine transitions between engaged and disengaged. The inter-spool clutch disengages when the high speed spool reaches a speed greater than an operational speed of the low speed spool.

In another exemplary embodiment of the present subject matter, a gas turbine engine is provided. The gas turbine engine comprises a low speed spool, a high speed spool, a rotor assembly, an engine clutch disposed between the low speed spool and the rotor assembly, and an inter-spool clutch disposed between the low speed spool and the high speed spool. The engine clutch is configured to selectively position the low speed spool in operative communication with the rotor assembly. The inter-spool clutch is configured to position the low speed spool in operative communication with the high speed spool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
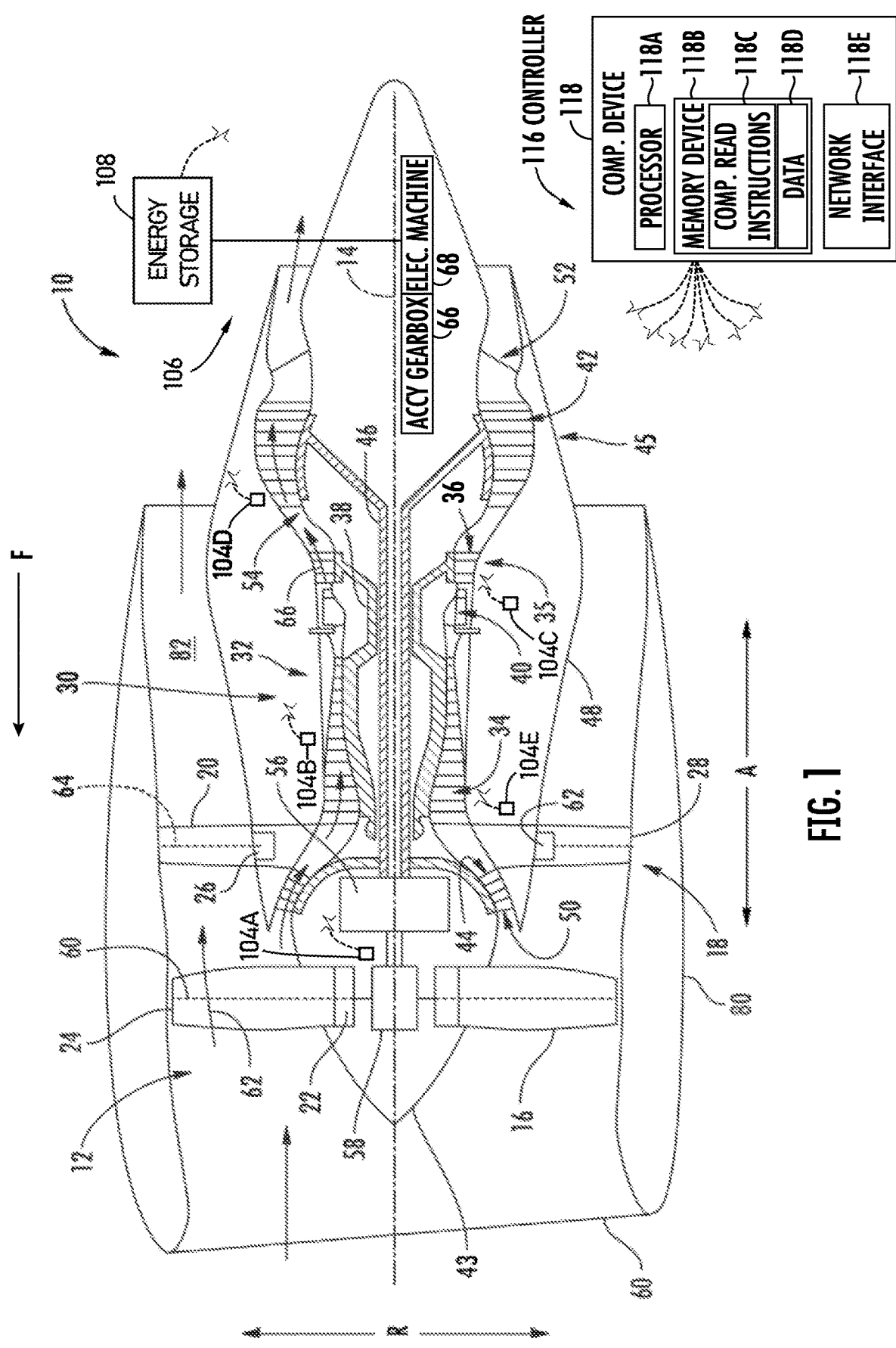
FIG. 1 is a schematic, cross-sectional view of a gas turbine engine in accordance with an exemplary aspect of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. The terms "coupled," "fixed," "attached to," and the like refer to both direct coupling, fixing, or attaching, as well as indirect coupling, fixing, or attaching through one or more intermediate components or features, unless otherwise specified herein. The singular forms "a," "an," and "the" include plural references unless the context clearly dictates otherwise.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine exhaust, or a component being relatively closer to the engine exhaust as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter is directed to systems and methods for facilitating integration of gas turbine engine mechanical and electrical power sources and allowing a gas turbine engine to provide electrical power without engagement of an aircraft rotor assembly. More particularly, the present subject matter is directed to a gas turbine engine comprising a low speed spool, a high speed spool, and a rotor assembly, with an engine clutch disposed between the low speed spool and the rotor assembly and an inter-spool clutch disposed between the low speed spool and the high speed spool. The engine clutch is configured to selectively position the low speed spool in operative communication with the rotor assembly, and the inter-spool clutch is configured to position the low speed spool in operative communication with the high speed spool. Further, an electric machine, such as a starter-generator, may be coupled to the low speed spool, e.g., directly or via an accessory gearbox mechanically coupled to the low speed spool. The starter-generator provides power for starting the engine, with the engine clutch disengaged from the rotor assembly and the inter-spool clutch engaged such that the high speed spool, or engine core, can be started and operated without turning the rotor assembly. Further, electrical power may be generated from the engine, via the starter-generator, without engaging the engine clutch and turning the rotor assembly or while the engine clutch is engaged and the rotor assembly is rotating.

Referring now to the drawings, FIG. 1 shows an elevational cross-sectional view of an exemplary embodiment of a gas turbine engine as may incorporate one or more inventive aspects of the present disclosure. In particular, the exemplary gas turbine engine of FIG. 1 is a configured as a single rotor, ducted engine 10 defining an axial direction A, a radial direction R, and a circumferential direction C (extending about the axial direction A). As is seen from FIG. 1, the engine 10 takes the form of a closed rotor propulsion system and has a rotor assembly 12 (e.g., a fan assembly) that includes an array of airfoils arranged around a central longitudinal axis 14 of the engine 10 and, more particularly, includes an array of rotor blades 16 arranged around the central axis 14. Moreover, as will be explained in more detail below, the engine 10 additionally includes a non-rotating vane assembly 18 (i.e., non-rotating with respect to the central axis 14) positioned aft of the rotor assembly 12, which includes an array of airfoils also disposed around the central axis 14. More particularly, the non-rotating vane assembly 18 includes an array of vanes 20 (e.g., outlet guide vanes) disposed around the central axis 14.

The rotor blades 16 are arranged in typically equally spaced relation around the central axis 14, and each blade has a root 22 and a tip 24 and a span defined therebetween. Similarly, the vanes 20 are also arranged in typically equally spaced relation around the central axis 14, and each has a root 26 and a tip 28 and a span defined therebetween. The rotor assembly 12 further includes a hub 43 located forward of the plurality of rotor blades 16.

Additionally, the engine 10 includes a turbomachine 30 having core or high speed system 32 and a low speed system. The core 32 generally includes a high speed compressor 34, a high speed turbine 36, and a high speed shaft 38 extending therebetween and connecting the high speed compressor 34 and high speed turbine 36. The high speed compressor 34 (or at least the rotating components thereof), the high speed turbine 36 (or at least the rotating components thereof), and the high speed shaft 38 may collectively be referred to as a high speed spool 35 of the engine. Further, a combustion section 40 is located between the high speed compressor 34 and high speed turbine 36. The combustion section 40 may include one or more configurations for receiving a mixture of fuel and air and providing a flow of combustion gasses through the high speed turbine 36 for driving the high speed spool 35.

The low speed system similarly includes a low speed turbine 42, a low speed compressor or booster 44, and a low speed shaft 46 extending therebetween and connecting the low speed compressor 44 and low speed turbine 42. The low speed compressor 44 (or at least the rotating components thereof), the low speed turbine 42 (or at least the rotating components thereof), and the low speed shaft 46 may collectively be referred to as a low speed spool 45 of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 similarly may be in an interdigitated arrangement.

Referring still to FIG. 1, the turbomachine 30 is generally encased in a cowl 48. Moreover, it will be appreciated that the cowl 48 defines, at least in part, an inlet 50 and an exhaust 52 and includes a turbomachinery flowpath 54 extending between the inlet 50 and the exhaust 52. For the embodiment shown, the inlet 50 is an annular or axisymmetric 360-degree (360°) inlet 50 located between the rotor assembly 12 and the fixed or stationary vane assembly 18. The inlet 50 provides a path for incoming atmospheric air to enter the turbomachinery flowpath 54 (and compressors 44, 34, combustion section 40, and turbines 36, 42) inwardly of the guide vanes 20 along the radial direction R. Such a location may be advantageous for a variety of reasons, including management of icing performance as well as protecting the inlet 50 from various objects and materials as may be encountered in operation. However, in other embodiments, the inlet 50 may be positioned at any other suitable location, e.g., aft of the vane assembly 18, arranged in a non-axisymmetric manner, etc.

As mentioned above, the engine 10 includes a vane assembly 18. The vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide vanes 20. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency.

Referring still to FIG. 1, it may be desirable that the rotor blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature, which may be useful in certain operating conditions, such as upon landing an aircraft, or to desirably adjust acoustic noise produced at least in part by the rotor blades 16, the vanes 20, or aerodynamic interactions from the rotor blades 16 relative to the vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 62 for rotating the vanes 20 about their respective pitch axes 64.

As is depicted, the rotor assembly 12 is driven by the turbomachine 30 and, more specifically, is driven by the low speed spool 45. More particularly, the engine 10 in the embodiment shown in FIG. 1 includes a power gearbox 56, and the rotor assembly 12 is driven by the low speed spool 45 of the turbomachine 30 across the power gearbox 56. The power gearbox 56 may include a gearset for decreasing a rotational speed of the low speed spool 45 relative to the low speed turbine 42, such that the rotor assembly 12 may rotate at a slower rotational speed than the low speed spool 45. In such a manner, the rotating rotor blades 16 of the rotor assembly 12 may rotate around the central axis 14 and generate thrust to propel the engine 10, and hence an aircraft to which it is associated, in a forward direction F.

As further shown in FIG. 1, the exemplary engine 10 includes a nacelle 80 circumferentially surrounding at least in part the rotor assembly 12 and turbomachine 30. The nacelle 80 defines a bypass passage 82 radially outward of the turbomachine 30. That is, the bypass passage 82 is defined between the nacelle 80 and the cowl 48 encasing the turbomachine 30.

Referring still to FIG. 1, the exemplary engine 10 includes an accessory gearbox 66 and an electric machine 68, with the turbomachine 30 driving the accessory gearbox 66 and the electric machine 68. For example, in certain exemplary embodiments, the accessory gearbox 66 may be coupled to the low speed spool 45 (e.g., the low speed shaft 46) through a suitable gear train, and the electric machine 68 may be coupled to the accessory gearbox 66. However, in other exemplary embodiments, the electric machine 68 may be coupled to the low speed spool 45 of the turbomachine 30 independently of the accessory gearbox 66, and the accessory gearbox 66 may be coupled to either the low speed spool 45 or the high speed spool 35. For example, the electric machine 68 may be directly coupled to the low speed spool 45 (and, thus, may be referred to as "embedded," such as an embedded starter-generator 68) rather than coupled to the low speed spool 45 via the accessory gearbox 66.

It will be appreciated, however, that the exemplary single rotor, ducted engine depicted in FIG. 1 is by way of example only, and in other exemplary embodiments, the engine 10 may have any other suitable configuration, including, for example, any other suitable number of shafts or spools, turbines, compressors, etc. Additionally, or alternatively, in other exemplary embodiments, any other suitable gas turbine engine may be provided. For example, in other exemplary embodiments, the gas turbine engine may be an unducted engine, a turbofan engine, a turboshaft engine, a turboprop engine, a turbojet engine, etc.

Figure 2:
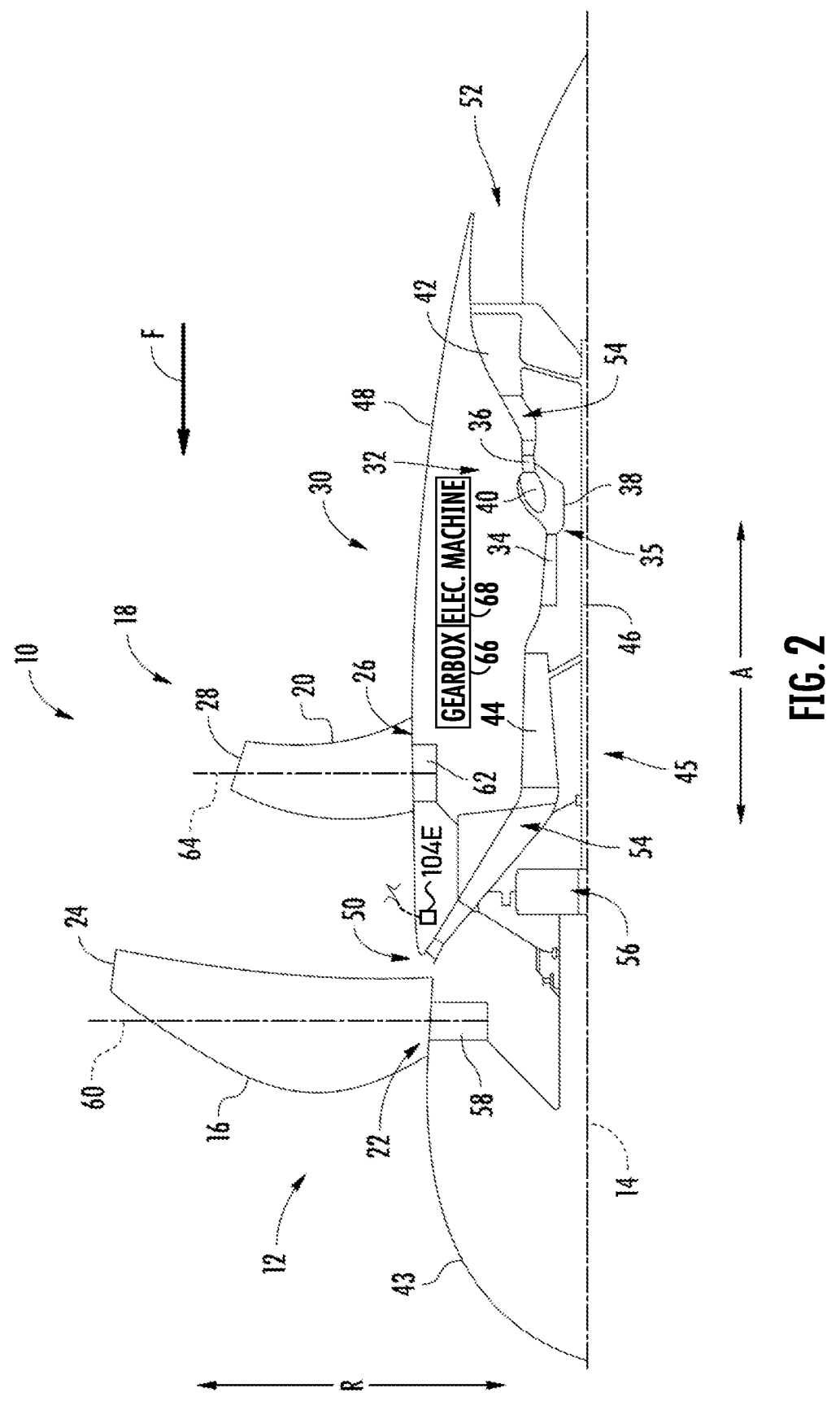
FIG. 2 is a schematic, cross-sectional view of a gas turbine engine in accordance with another exemplary embodiment of the present subject matter.

For example, referring now to FIG. 2, an elevational cross-sectional view of another exemplary embodiment of a gas turbine engine is disclosed as may incorporate one or more inventive aspects of the present disclosure. In particular, the exemplary gas turbine engine of FIG. 2 is a configured as a single rotor, unducted engine 10. The exemplary embodiment of FIG. 2 may be configured in substantially the same manner as the exemplary engine 10 described above with respect to FIG. 1, and the same or similar reference numerals may refer to the same or similar parts. For instance, in the depicted embodiment of FIG. 2, the engine 10 includes a rotor assembly 12 that includes an array of airfoils arranged around a central longitudinal axis 14 of engine 10 and, more particularly, includes an array of rotor blades 16 arranged around the central axis 14. The exemplary engine 10 additionally includes a non-rotating vane assembly 18 (i.e., non-rotating with respect to the central axis 14) that is positioned aft of the rotor assembly 12 and includes an array of airfoils also disposed around the central axis 14. More particularly, the vane assembly 18 includes an array of vanes 20 disposed around the central axis 14. In a similar manner, the remaining reference numerals in FIG. 2 that are the same as the reference numerals in FIG. 1 may refer to the same or similar parts.

However, as will be appreciated, for the open rotor propulsion system embodiment shown in FIG. 2, the engine 10 includes both an array of rotor blades 16 and an array of vanes assembly that are unducted or open. In additional or alternative embodiments, it be appreciated that at least one array of rotor blades 16 or one array of vanes 20 may be ducted while at least one array of vanes 20 or rotor blades 16 is in an open arrangement.

Figure 3A:
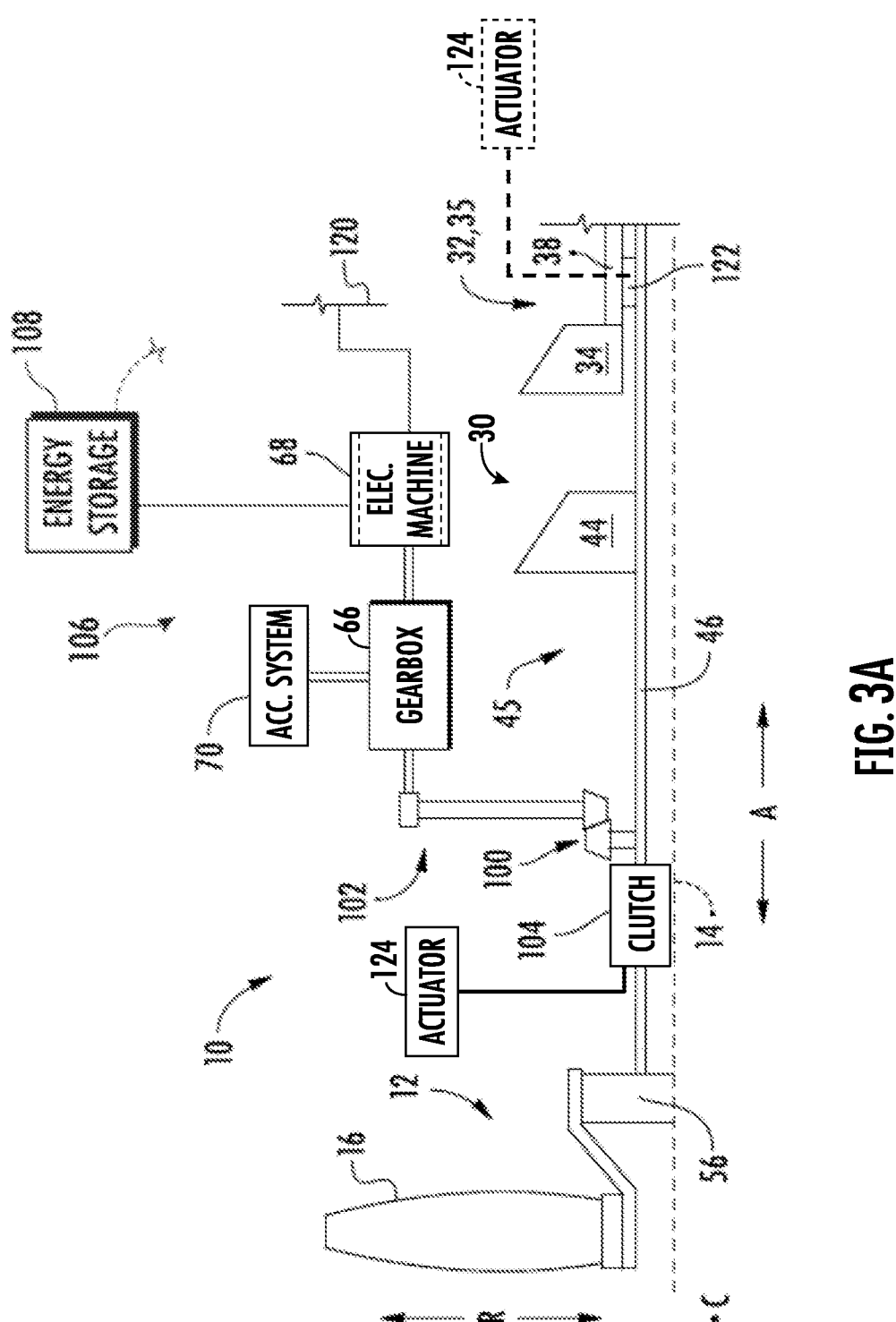
FIGS. 3A and 3B are other schematic, cross-sectional views of gas turbine engines in accordance with another exemplary aspect of the present subject matter.
Figure 3B:
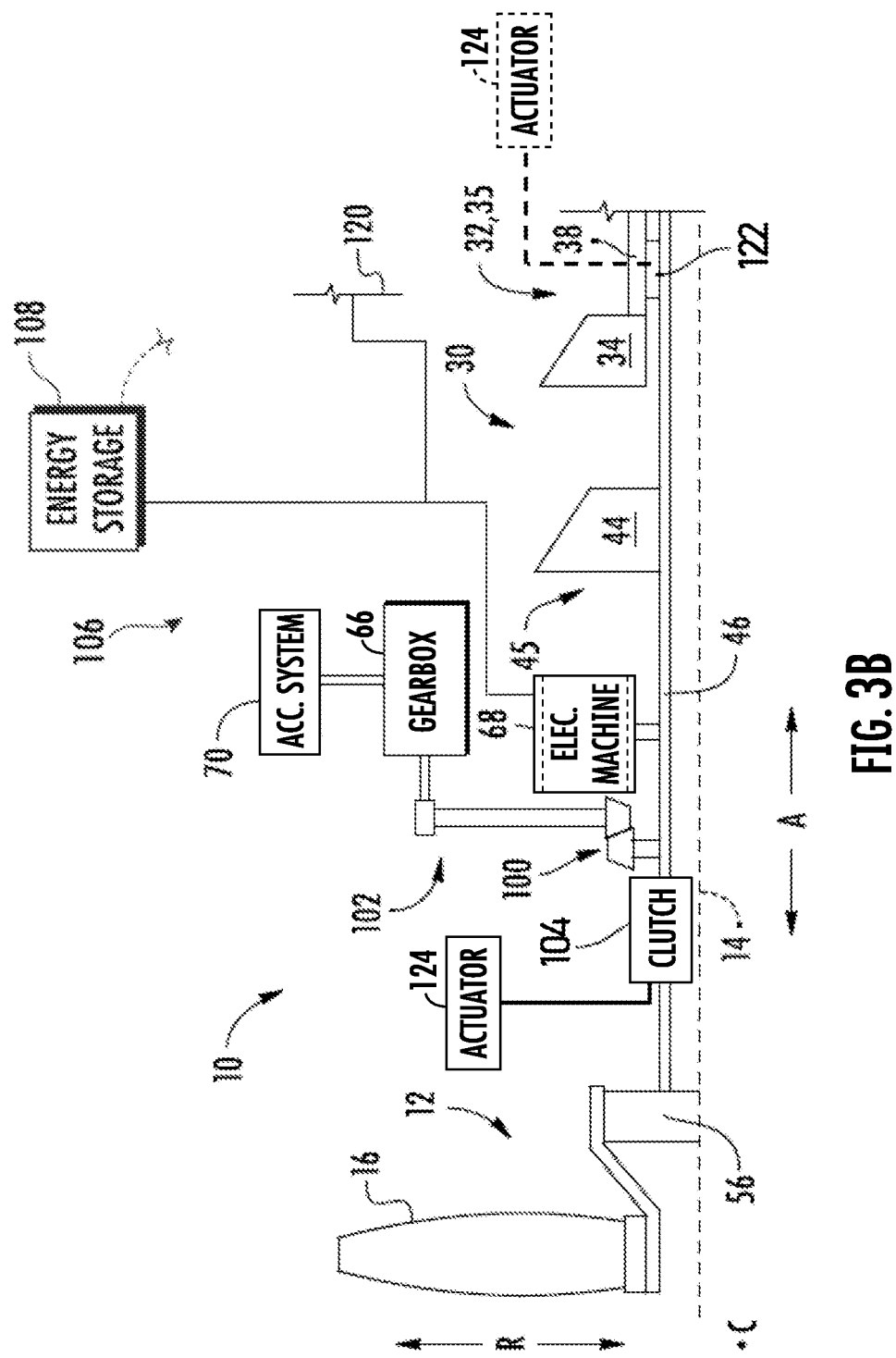

Referring now to FIGS. 3A and 3B, schematic views are depicted of a gas turbine engine 10 in accordance with exemplary embodiments of the present disclosure. The exemplary gas turbine engine 10 of each of FIGS. 3A and 3B may be configured in a similar manner as the exemplary engines 10 described above with respect to FIG. 1 or FIG. 2 or any other suitable gas turbine engine. Specifically, for the embodiment shown, the engine 10 includes an electric machine 68 mechanically coupled to a low speed spool 45 of a turbomachine 30 of the engine 10. More specifically, the engine 10 includes an accessory gearbox 66 mechanically coupled to a low speed spool 45 of the engine 10, with the electric machine 68 being coupled to the low speed spool 45 through the accessory gearbox 66. More specifically still, the low speed spool 45 includes a low speed shaft 46 and forms, at least in part, a low speed compressor 44 and low speed turbine 42 (not shown). The accessory gearbox 66 is depicted coupled to the low speed shaft 46 of the low speed spool 45.

In such a manner, the accessory gearbox 66 may transfer rotational power from the low speed spool 45 of the engine 10 to, e.g., one or more accessory systems 70 of the engine 10 or an aircraft incorporating the engine 10 that are mechanically coupled to the accessory gearbox 66 and the electric machine 68 (which is rotatable with the accessory gearbox 66). The engine 10 further includes a rotor assembly 12 and a power gearbox 56, with the rotor assembly 12 being driven by the low speed spool 45 across the power gearbox 56. More particularly, for the embodiment shown, the power gearbox 56 defines a gear ratio for reducing the rotational speed of the rotor assembly 12 relative to the low speed spool 45. In at least certain exemplary embodiments, the gear ratio may be greater than or equal to about 3:1 and less than or equal to about 12:1. For example, in certain exemplary embodiments, the gear ratio may be between greater than or equal to about 7:1 and less than or equal to about 12:1. In such a case, the power gearbox 56 may be a multi-stage or compound power gearbox (e.g., a planetary gearbox having compound planet gears, etc.).

As will be appreciated, the various electrical and other accessory systems of a gas turbine engine 10 are typically powered off an accessory gearbox driven by a core 32 of the engine 10, or more specifically, the high speed/high pressure system of the engine 10, e.g., a high speed spool 35. With such a configuration, the engine core 32 is generally over-sized to allow for operation of these accessory systems throughout the entire flight envelope. Notably, however, such a configuration may reduce a responsiveness of the engine 10 by virtue of the additional loads and inertia on the core 32 of the engine 10. It will be appreciated that by coupling the accessory gearbox 66 and electric machine 68 to the low speed spool 45 of the engine 10, as opposed to the high speed spool 35, the gas turbine engine 10 may have a more responsive core 32. Moreover, while such may, in turn, result in a less responsive low speed system and rotor assembly 12, inclusion of the electric machine 68 may make up the responsiveness.

Referring particularly to FIG. 3A, it will be appreciated that the electric machine 68 is coupled to the low speed spool 45 of the turbomachine 30 at a connection point 100 of the low speed spool 45. More specifically, for the embodiment shown, the accessory gearbox 66 is coupled to the low speed spool 45 at the connection point 100, and the electric machine 68 is coupled to the low speed spool 45 through the accessory gearbox 66. Moreover, for the embodiment shown, the turbomachine 30 includes a gear train 102 coupled to the low speed spool 45 at the connection point 100 and extending to the accessory gearbox 66. In such a manner, the accessory gearbox 66 may transfer rotational power from the low speed spool 45 of the engine 10 to, e.g., one or more accessory systems 70 mechanically coupled to the accessory gearbox 66 and the electric machine 68 rotatable with the accessory gearbox 66.

However, in other exemplary embodiments, such as illustrated in FIG. 3B, the electric machine 68 may be coupled to the low speed spool 45 of the turbomachine 30 independently of the accessory gearbox 66. For example, the electric machine 68 may be directly coupled to the low speed spool 45 (and, thus, may be referred to as "embedded," such as an embedded starter-generator 68) rather than coupled to the low speed spool 45 via the accessory gearbox 66. In such embodiments, the accessory gearbox 66 may be coupled to either the low speed spool 45 or the high speed spool 35.

As further illustrated in FIGS. 3A and 3B, the engine 10 may be integrated with an electric power system 106. The electric power system 106 generally includes the electric machine 68 and an energy storage unit 108. The electric power bus 120 electrically connects the various components of electric power system 106. The electric power bus 120 may be, e.g., one or more electrical lines arranged in any suitable configuration.

In some embodiments, the electric machine 68 depicted in FIGS. 1-3B is not the only electric machine of the electric power system 106 integrated with the engine 10. In some embodiments, the electric power system 106 includes both an LP electric machine coupled to the low speed/low pressure system of the engine 10 and an HP electric machine coupled to the high speed/high pressure system or core 32 of the engine 10. Both electric machines 68 are in electrical communication with the electric power bus 120.

In at least certain exemplary embodiments, the energy storage unit 108 may include one or more batteries. Additionally, or alternatively, the energy storage unit 108 may include one or more supercapacitor arrays, one or more ultracapacitor arrays, or both. In at least certain embodiments, the energy storage unit 108 may be configured to provide at least 5 kilowatts (kW) of energy to the electric power system 106, such as at least 50 kW, such as at least 50 kW, such as at least 250 kW, such as at least 300 kW, such as at least 350 kW, such as at least 400 kW, such as at least 500 kW, such as up to 5 megawatts (MW), such as up to 10 megawatts (MW). Further, the energy storage unit 108 may be configured to provide such electrical power for at least two minutes, such as at least three minutes, such as at least five minutes, such as up to an hour. Further, still, in other embodiments, the energy storage unit 108 may be configured to provide such electrical power for any other suitable duration.

Referring still to the exemplary embodiments of FIGS. 1-3B, although not depicted, it will be appreciated that the exemplary electric power system 106 also may include an auxiliary power unit. The auxiliary power unit, if included, may comprise a combustion engine driving an electric generator and may be located remotely from the engine 10. For example, in at least certain exemplary embodiments, the auxiliary power unit, if provided, may be located within a fuselage of the aircraft utilizing the engine 10, e.g., at an aft end of the aircraft, and electrically coupled to the electric power bus 120.

Further, as is depicted in FIGS. 3A and 3B, the exemplary gas turbine engine 10 includes an engine clutch 104 positioned in a torque path of the low speed spool 45 at a location forward of the connection point 100 of the low speed spool 45 (where the accessory gearbox 66 is coupled to the low speed spool 45 through the gear train 102). Specifically, for the embodiment shown, the engine clutch 104 is positioned in the torque path of the low speed spool 45 between the connection point 100 and the rotor assembly 12.

The engine clutch 104 may be moved between an engaged position, wherein torque may be transmitted across the engine clutch 104 along the low speed spool 45 to drive the rotor assembly 12 (or vice versa), and a disengaged position, wherein torque may not be transmitted across the engine clutch 104 along the low speed spool 45 to the rotor assembly 12. In such a manner, the engine clutch 104 may facilitate operation of the engine 10 without rotating the rotor assembly 12. Such may be beneficial, particularly during certain ground operations wherein it may be desirable to rotate the turbomachine 30 without creating thrust from the rotor assembly 12.

In at least certain exemplary aspects, the engine clutch 104 may be a positive engagement device, such as a friction clutch, and may be a two-stage clutch for transitioning from the disengaged position to the engaged position. As will be appreciated, when the engine clutch 104 is in the disengaged position, the low speed spool 45 may rotate freely relative to the rotor assembly 12. By contrast, when the engine clutch 104 is in the engaged position, the low speed spool 45 rotates with the rotor assembly 12. It will further be appreciated that such a configuration may allow for improved operations of the gas turbine engine 10. For example, such a configuration may allow for operation of the core 32 of the gas turbine engine 10 during, e.g., idle and post-landing operations, without engaging in rotating the rotor assembly 12. In such a manner, the electric machine 68 may be sized to accept 100% of a rated engine power, such that the gas turbine engine 10 may be operated at a rated engine power without engaging the rotor assembly 12 (i.e., without moving the engine clutch 104 to the engaged position) and may have the electric machine 68 convert substantially all of such power to electrical energy to be provided to, e.g., the aircraft incorporating the gas turbine engine 10 through an electric bus 120, to one or more energy storage units within or in electrical communication with the bus 120, to assist with starting additional engines, a combination thereof, etc. Subsequently, when it is desirable to produce thrust with the rotor assembly 12, the engine clutch 104 may be moved from a disengaged position to the transition position, slowly bringing the rotor assembly 12 up to speed before then moving the engine clutch 104 to the engaged position, rotationally locking the rotor assembly 12 to the low speed spool 45. Some slippage of the engine clutch 104 may occur during engagement; slipping of the engine clutch 104 allows the speed of the engine 10 to be independently controlled while the rotor assembly 12 is accelerating, which can help the engine 10 avoid resonant frequency ranges.

It will further be appreciated that, with the above configuration, the electric machine 68 may be utilized to accelerate the rotor assembly 12 more quickly during preflight operations once the engine clutch 104 is moved to the engaged position. More specifically, electrical power may be provided to the electric machine 68 and converted to rotational power provided through the accessory gearbox 66 to the low speed spool 45 to directly assist with accelerating the rotor assembly 12. Such may ensure the low speed spool 45 has a desired responsiveness despite the mounting of the accessory gearbox 66 to the low speed spool 45.

As will also be appreciated, in such a manner, the electric machine 68 may be used to start, or assist with starting, the engine 10. Referring still to the illustrated embodiments of FIGS. 3A and 3B, it will be appreciated that the depicted exemplary engine 10 further includes an inter-spool clutch 122 positioned between the low speed/low pressure system of the gas turbine engine 10 and the high speed/high pressure system of the gas turbine engine 10. Particularly, for the embodiment shown, the inter-spool clutch 122 is positioned between the low speed spool 45 and the high speed spool 35. The inter-spool clutch 122 may ensure that the low speed/ low pressure system does not rotate faster than the high speed/high pressure system. The inter-spool clutch 122 may be, e.g., a one-way or overrunning clutch, such as a sprag clutch. In such a manner, the electric machine 68 may be operable as the starter motor for the gas turbine engine 10. For example, during starting operations, the electric machine 68 may receive electrical power through an electric power bus 120 and convert such power to mechanical power transmitted through the accessory gearbox 66 and gear train 102 to the low speed spool 45, rotating the low speed spool 45. The inter-spool clutch 122 may be engaged by such rotation, such that the low speed spool 45 correspondingly rotates the high speed spool 35 across the inter-spool clutch 122. Once the gas turbine engine 10 has reached a light-off point such that a combustion section may be ignited to start generating combustion gasses to drive the high speed system, the high speed spool 35 may rotate more quickly than the low speed spool 45, and the inter-spool clutch 122 may be automatically disengaged, allowing for such a speed differential. In such a manner, the electric machine 68 may assist with starting the engine 10 by directly rotating the high speed spool 35, despite being coupled to the low speed spool 45.

Referring still to the embodiments of FIGS. 3A and 3B, once the aircraft including the gas turbine engine 10 has landed, the engine clutch 104 may be disengaged (i.e., moved to the disengaged position), such that the rotor assembly 12 may be immediately shut down after thrust is no longer needed from such engine 10. Such immediate shutdown of the rotor assembly 12 allows additional time for the gas turbine engine 10 to cool, allows the gas turbine engine 10 to provide full electrical power on the ground without operating the rotor assembly 12 (and without producing significant thrust), may enable electric ground taxi, etc.

It will be appreciated, however, that in other exemplary embodiments the engine 10 may have any other suitable configuration. For example, the electric machine 68 may be coupled to the low speed spool 45 independently of the accessory gearbox 66 at an electric machine connection point, and the accessory gearbox 66 may coupled to the low speed spool 45 at a distinct low speed spool connection point. For example, the electric machine 68 may be coupled through an electric machine gear train and the accessory gearbox 66 may be coupled through a separate accessory gearbox gear train. In still further embodiments, such an electric machine 68 and/or accessory gearbox 66 may not be included. Still other configurations are contemplated as well.

As described herein, the engine clutch 104 is configured to selectively position the low speed spool 45 in operative communication with the rotor assembly 12. That is, the engine clutch 104 allows selective engagement of the low speed shaft 46 with the rotor assembly 12 such that the low speed shaft 46, or power turbine output, can be selectively connected with or disconnected from the aircraft thrust mechanism, i.e., rotor assembly 12. Similarly, the inter-spool clutch 122 is configured to position the low speed spool 45 in operative communication with the high speed spool 35. More particularly, when the inter-spool clutch 122 is engaged, the low speed spool 45 is in operative communication with the high speed spool 35 such that the inter-spool clutch 122 transfers rotational speed from the low speed shaft 46 to the high speed shaft or core rotor 38. In exemplary embodiments, the inter-spool clutch 122 automatically disengages, e.g., once the high speed shaft or core rotor 38 reaches a speed greater than an operational speed of the low speed shaft 46. In other embodiments, however, the inter-spool clutch 122 may be configured to selectively position the low speed spool 45 in operative communication with the high speed spool 35. In such selective positioning embodiments, the inter-spool clutch 122 is not a one-way clutch but may be any other suitable clutch for selectively positioning the low speed spool 45 in operative communication with the high speed spool 35.

Figure 4:
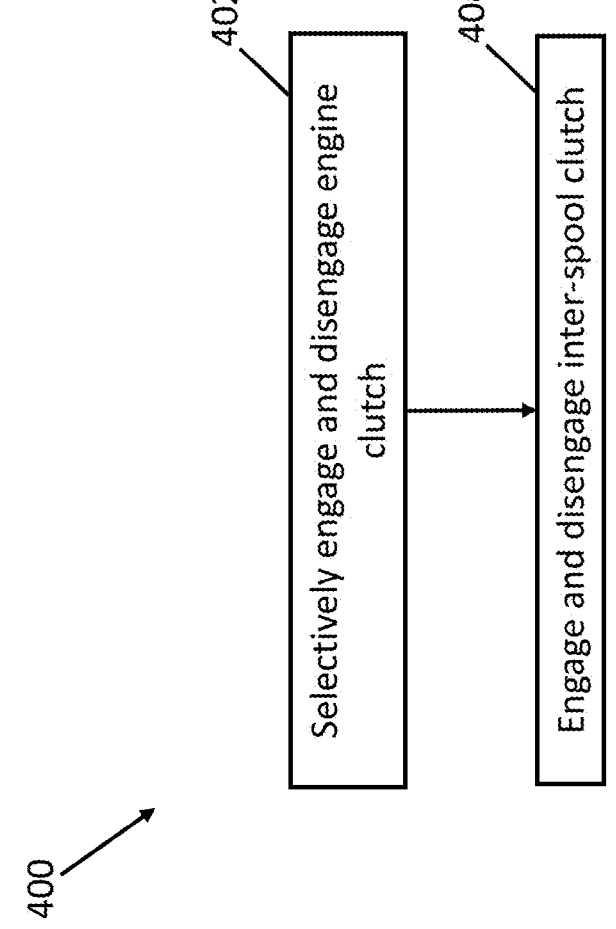
FIG. 4 is a flow diagram illustrating a method of operating an aircraft in accordance with an exemplary embodiment of the present subject matter.

The engine clutch 104 and the inter-spool clutch 122 each may be moved between disengaged and engaged positions depending on an operating condition of the engine 10 or the aircraft. More specifically, FIG. 4 provides a flow diagram illustrating a method of operating an aircraft comprising a gas turbine engine, such as engine 10, according to an exemplary embodiment of the present subject matter. As shown in FIG. 4, the exemplary method 400 includes at block 402 selectively engaging and disengaging an engine clutch 104 disposed between a low speed spool 45 and a rotor assembly 12 of the engine 10. Engagement or disengagement of the engine clutch 104 is selected based on an operating condition of the aircraft or engine 10, as described in greater detail below. As depicted at block 404, the exemplary method 400 further includes engaging and disengaging an inter-spool clutch 122 disposed between the low speed spool 45 and a high speed spool 35 of the engine 10. In some embodiments, disengagement of the inter-spool clutch 122 may be automatic, e.g., the inter-spool clutch 122 may be a one-way or overturning clutch configured to disengage the two spools to prevent one spool from rotating faster than desired, or the inter-spool clutch 122 may be a suitable clutch for selective disengagement. Moreover, as discussed herein, when engaged, the respective clutch 104, 122 transmits torque across the clutch along the respective spool 35, 45, and when disengaged, torque may not be transmitted across the respective clutch 104, 122 along the respective spool 35, 45. Thus, the engine clutch 104 may facilitate operation of the engine 10 without rotating the rotor assembly 12, and the inter-spool clutch 122 may facilitate the transfer of rotational speed from the low speed shaft 46 to the high speed shaft 38 to start the core 32 using the electric machine 68 (which may be, e.g., a starter-generator) coupled to the low speed spool 45.

FIGS. 5 through 9 illustrate various exemplary operating conditions of the engine 10 or an aircraft 1 comprising the engine 10. It will be appreciated that FIGS. 5 through 9 schematically depict the engagement or disengagement of the respective clutch 104, 122. More specifically, in FIGS. 5 through 9, a shaded clutch 104, 122 (i.e., a clutch that appears gray as opposed to white or unshaded) represents a disengaged clutch while an unshaded clutch 104, 122 (i.e., a clutch that appears white as opposed to gray or shaded) represents an engaged clutch. The shading or lack of shading of the respective clutch or clutches 104, 122 is for purposes of illustration only, to more readily indicate whether a clutch is engaged or disengaged in the schematic depictions.

Figure 5:
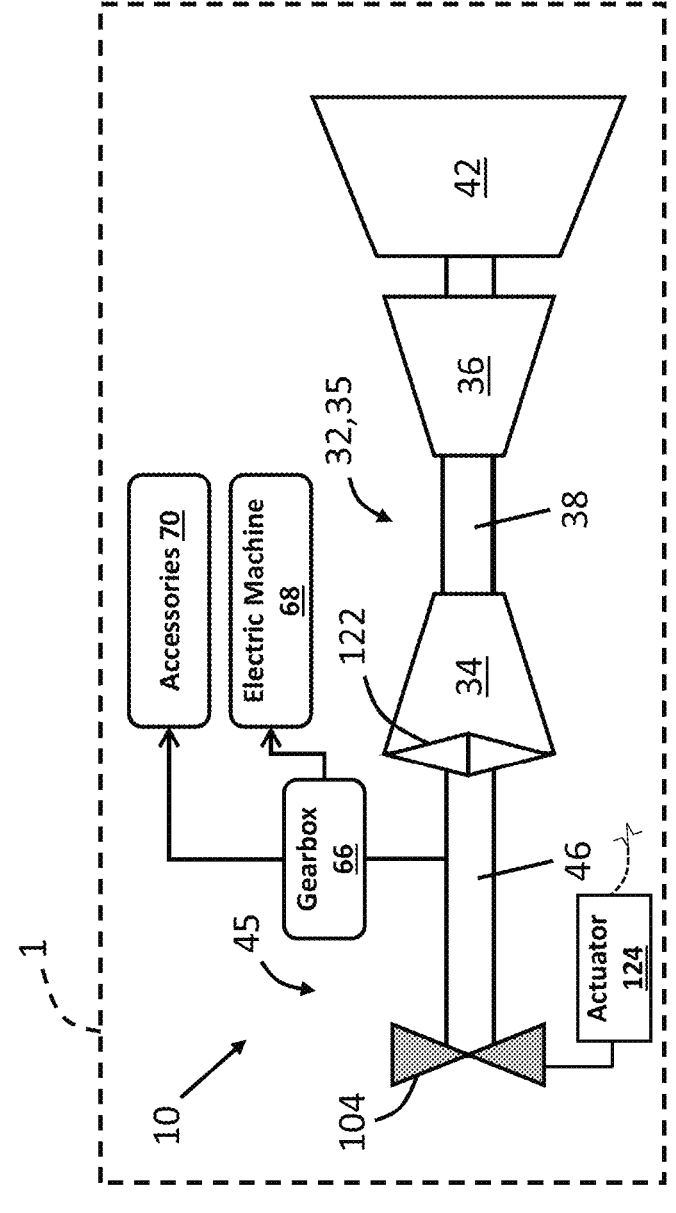
FIG. 5 is a schematic, cross-sectional view of a gas turbine engine in an engine start condition or engine start mode in accordance with an exemplary embodiment of the present subject matter.

Referring particularly to FIG. 5, when the operating condition is an engine start condition, the engine clutch 104 is disengaged and the inter-spool clutch 122 is engaged. As previously described, in exemplary embodiments, the electric machine 68 is a starter-generator 68 for providing electrical power to and generating electrical power from the engine 10. During engine start, the starter-generator 68 provides power to the engine 10. More specifically, the starter-generator 68 may be mechanically coupled to the low speed shaft 46 of the low speed spool 45 through the accessory gearbox 66 as described herein. Power is applied to the starter-generator 68 to induce rotation of the low speed shaft 46, and with the inter-spool clutch 122 engaged, the inter-spool clutch 122 transfers rotational speed from the low speed spool 45 across the clutch 122 to the core rotor or high speed shaft 38, accelerating the core 32 at the same speed as the low speed spool 45. The engine clutch 104 between the low speed spool 45 and the rotor assembly 12 is disengaged such that the core 32 and power turbine or low speed spool 45 operate without turning the aircraft rotor. Once the low speed spool 45 is accelerated to full or 100% speed, power is no longer required to the starter-generator 68 and combustor lightoff occurs. After lightoff of the combustor, the high speed shaft 38 of the core 32 accelerates to idle above the speed of the low speed shaft 46, and the start cycle is complete.

It will be appreciated that rotation of the low speed spool 45 may induce airflow through the core 32 and may thereby increase core airflow compared to typical engine start cycles, where the low speed spool 45 is stationary because the starter-generator is coupled to the high speed shaft 38 rather than the low speed shaft 46 as described herein. Increased core airflow during engine startup may improve engine starting performance.

Figure 6:
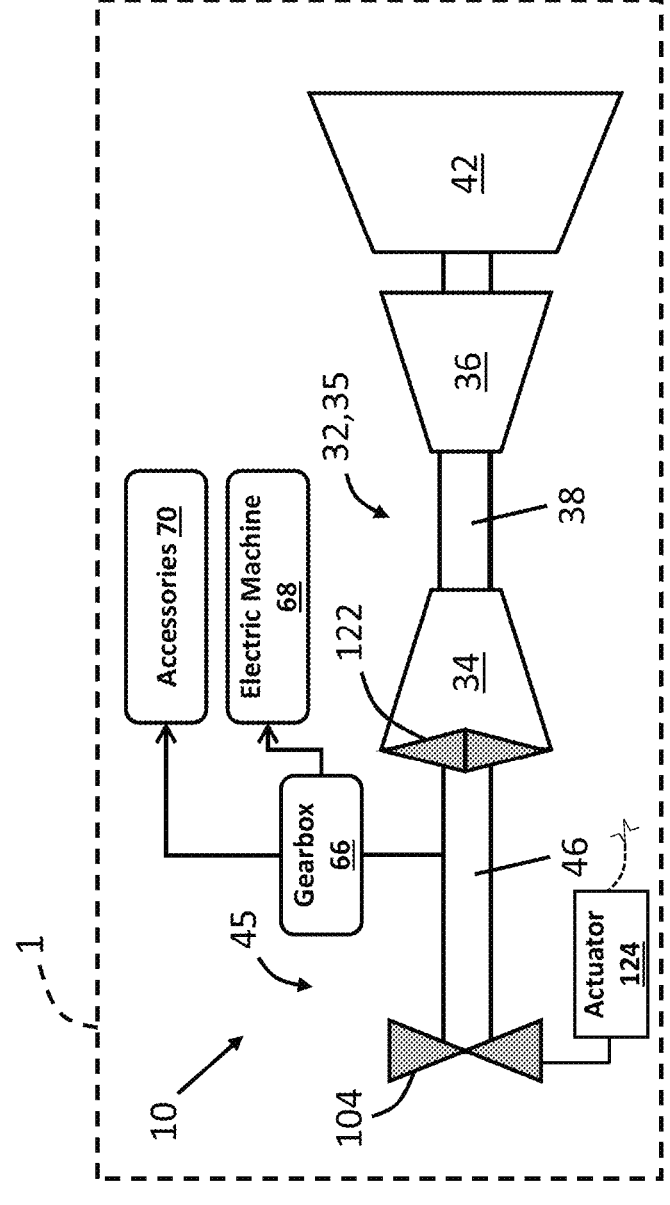
FIG. 6 is a schematic, cross-sectional view of a gas turbine engine in an engine idle condition or engine idle mode in accordance with an exemplary embodiment of the present subject matter.

Referring now to FIG. 6, when the operating condition is an engine idle condition, the engine clutch 104 is disengaged and the inter-spool clutch 122 is disengaged. During engine idle, the starter-generator 68 generates power from the engine 10 rather than providing power to the engine 10 like during the engine start condition described above. Further, the declutched configuration illustrated in FIG. 6 allows the engine 10 to provide full rated electrical power during engine idle while the aircraft is on the ground, declutched from the rotor assembly 12. The declutched configuration may enable functions such as electric ground taxi. Moreover, the declutched configuration allows the engine 10 to operate with normal rotor speeds and secondary system function and, thus, to operate without a time limited rating such that the engine 10 may provide more electrical power than is achievable in other known engine configurations. Because the engine 10 can provide full electrical power without the rotors turning, the aircraft also may be useable as a temporary power generation station, e.g., for external use or to recharge onboard energy storage devices. Further, using the clutch configuration described herein, a lower exhaust gas temperature compared to known engine configurations may be realized for the same electrical power provided, and improved specific fuel consumption (SFC) may be realized.

The disengaged engine clutch 104 between the low speed spool 45 and the rotor assembly 12 prevents the main aircraft rotor 12 from turning while the engine core 32 is idling, which may avoid use of a rotor brake to prevent rotation of the rotor assembly 12. More particularly, a core-mounted generator, rather than mounting the starter-generator 68 on the low speed spool 45 as described herein, operates in a locked rotor condition through use of a rotor brake to prevent rotation of the rotor assembly 12. Inadvertent rotor brake release or rotor brake failure can cause hazardous conditions; thus, eliminating the rotor brake by including the engine clutch 104 may improve safety.

Figure 7:
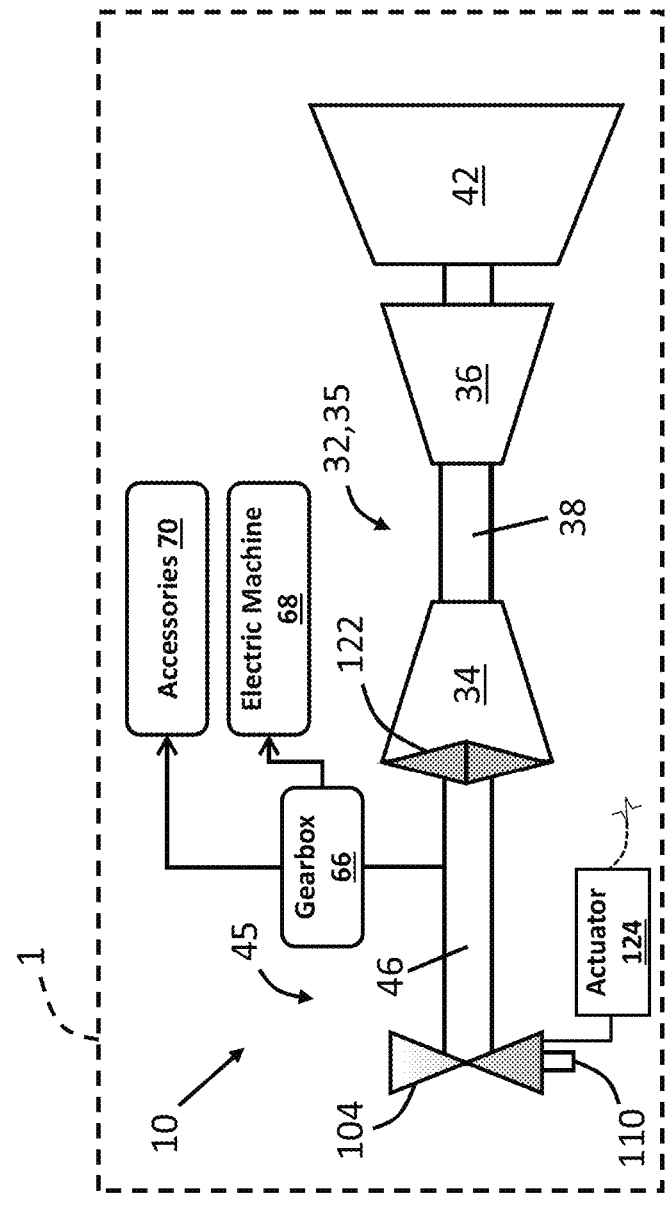
FIG. 7 is a schematic, cross-sectional view of a gas turbine engine in a pre-flight condition or pre-flight mode in accordance with an exemplary embodiment of the present subject matter.

Turning to FIG. 7, when the operating condition is a pre-flight condition, i.e., before aircraft take-off, the engine clutch 104 is engaged and the inter-spool clutch 122 is disengaged. Like engine idle, the starter-generator 68 may generate power from the engine 10 during the pre-flight condition. Engaging the engine clutch 104 during pre-flight positions the rotor assembly 12 in operative communication with the low speed spool 45 and thereby rotate the rotor assembly 12. The engine clutch 104 may be engaged according to a pre-set schedule or may be actively controlled. Further, the engine clutch 104 is engaged during pre-flight when the low speed spool 45 is rotating at 100% speed. Thus, the engine clutch 104 may be configured to allow clutch slippage as the engine clutch 104 transitions from disengaged to engaged to allow independent control of the speed of the engine 10 while the rotor assembly 12 is accelerating. More particularly, although the speed of the low speed spool 45 may be varied (e.g., reduced) during acceleration of the rotor assembly 12 to optimize clutch performance, the speed range can be controlled to avoid specific speeds that coincide with engine or aircraft resonant frequencies, which may prevent damaging operation at selected frequencies.

Once the low speed spool 45 and the rotor assembly 12 (i.e., the aircraft rotor) are matched in speed, a positive engagement feature or positive locking feature 110 may be engaged to ensure shaft power availability in operation and reduce certification complexity. That is, the positive locking feature 110 may be incorporated such that the engine clutch 104 is operable only when the aircraft is on the ground, ensuring shaft power is provided to the rotor assembly 12 via the low speed spool 45 during flight operations. The positive locking feature 110 may be a retractable spline or the like and may be powered by oil pressure or the like to help ensure the positive locking feature 110 is not accidentally disengaged.

The clutch configuration illustrated in FIG. 7 may allow the rotor assembly 12 to accelerate faster than other known designs. Further, the exemplary clutch configuration described herein allows the engine 10 to warmup while the rotor assembly 12 remains stationary. As shown in FIG. 7, the engine clutch 104 may be engaged after acceleration of the core 32 to speed, and as needed or desired, the engine clutch 104 may be engaged after a prolonged period of operating the high speed and low speed spools 35, 45 to generate electrical power from the engine 10 via the electric machine 68.

Figure 8:
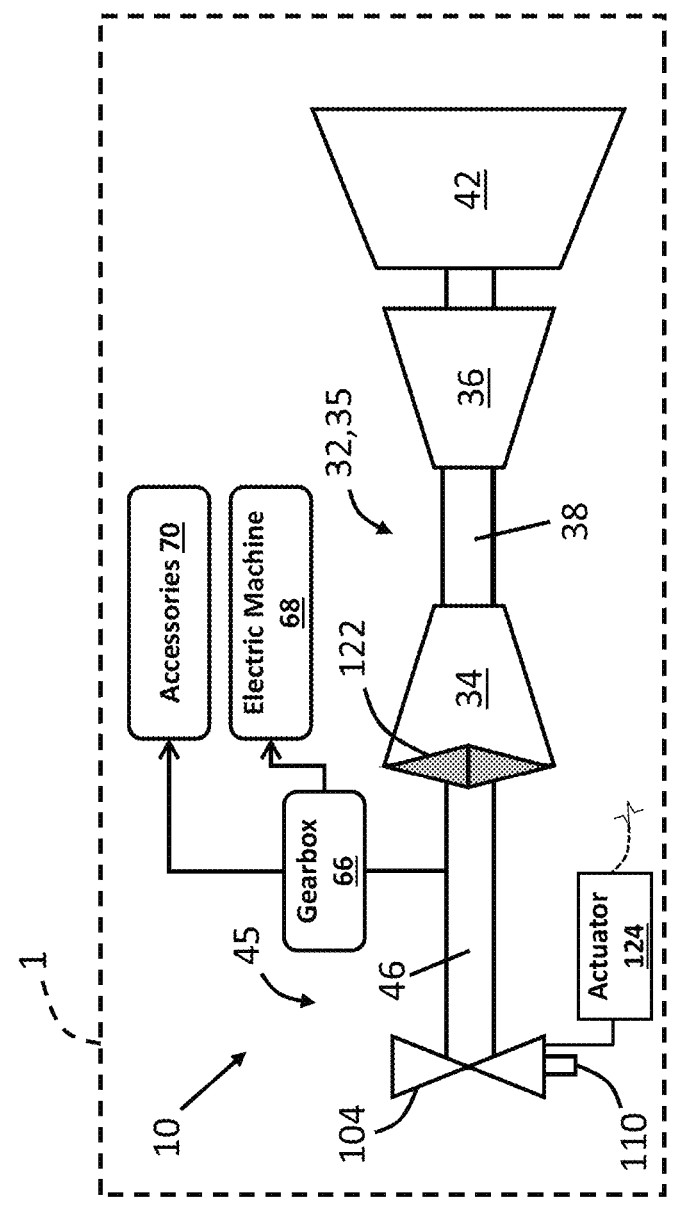
FIG. 8 is a schematic, cross-sectional view of a gas turbine engine in a flight condition or flight mode in accordance with an exemplary embodiment of the present subject matter.

Referring now to FIG. 8, when the operating condition is a flight condition, i.e., during take-off, cruise, and landing of the aircraft, the engine clutch 104 is engaged and the inter-spool clutch 122 is disengaged. As described with respect to FIG. 7, a positive locking feature 110 may be used to lock the engine clutch 104 into engagement during flight. The positive locking feature 110 fully locks the interface between the low speed spool 45 and the rotor assembly 12 to prevent disengagement during flight as previously described. In other embodiments, however, the engine clutch 104 may be disengaged in flight for shutdown of the engine 10, e.g., for fuel burn reduction or operation as a generator only.

Further, the starter-generator 68 may be configured to both provide power to and generate power from the engine 10 during flight. More particularly, main rotor gearboxes of multiengine rotorcraft, and each propeller of turboprop aircraft, generally desire engine output to be the same for each engine. For example, if one of the engines is more efficient, or "healthier," than another, the healthier engine will operate at a lower core speed and turbine temperature than the other engine(s), which can result in rapid deterioration of the engine that is less healthy and may be considered distracting to the pilot of the aircraft. The clutch configuration described herein would allow the healthy engine to electrically supplement the power of the less healthy engine, which may facilitate engine load matching (or matching net output to the aircraft) and optimize engine life. Moreover, in the event of an engine failure or a flight mode requiring more than the rated power of engine 10, an alternative power source, such as an auxiliary power unit (APU) or storage device such as energy storage unit 108, can provide power to the starter-generator 68, which is mechanically coupled to the low speed shaft 46 through the accessory gearbox 66 as described herein. Such power can be applied to either the starter-generator 68 of the operating engine 10 or the failed engine 10, potentially allowing increased emergency power within the ratings of the aircraft's gearboxes.

Figure 9:
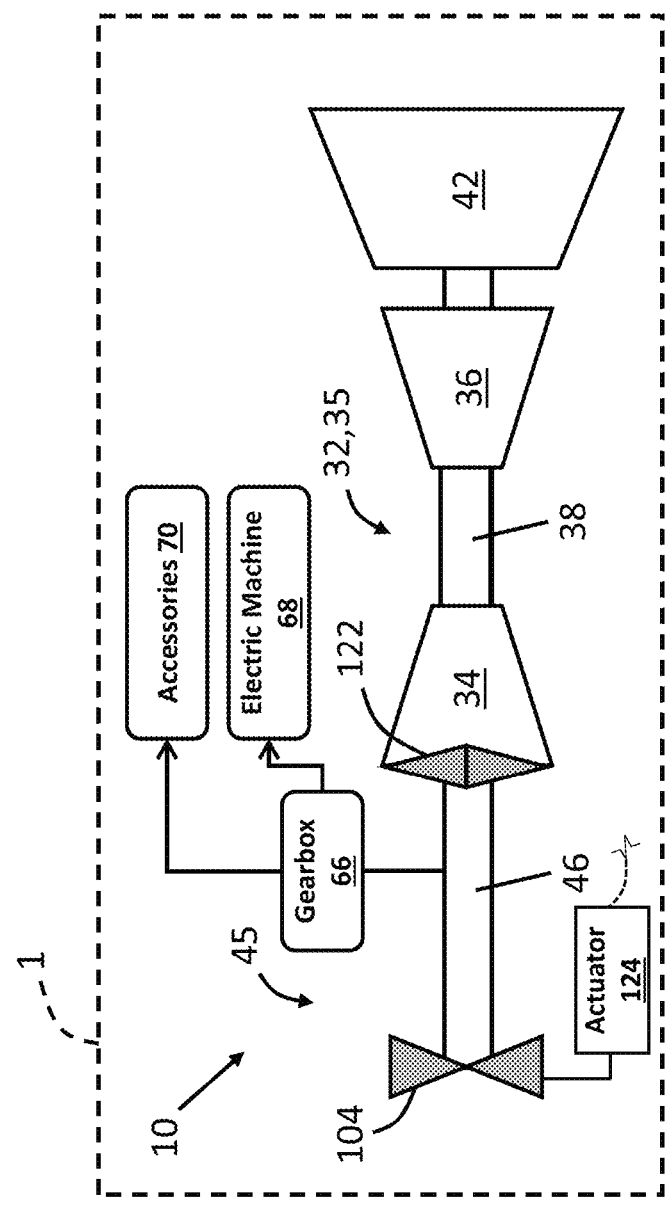
FIG. 9 is a schematic, cross-sectional view of a gas turbine engine in a post-landing condition or post-landing mode in accordance with an exemplary embodiment of the present subject matter.

Turning now to FIG. 9, when the operating condition is a post-landing condition, i.e., after the aircraft has returned to the ground from flight, the engine clutch 104 is disengaged and the inter-spool clutch 122 is disengaged. Like the engine idle and pre-flight conditions, the starter-generator 68 generates power from the engine 10 during the post-landing condition. In exemplary embodiments, the engine clutch 104 is disengaged immediately upon landing such that low speed spool 45 (including the engine power turbine or low speed turbine 42) is declutched from the main aircraft rotor 12 immediately upon landing. As such, the main aircraft rotor 12 can immediately be slowed by a rotor brake or aerodynamics, and the engine 10 can be cooled independently of main rotor speed or left running without shutdown, e.g., if a return to flight is needed.

Current practice generally requires an engine cooldown period after landing, followed by engine shutdown, followed by stoppage of the rotor assembly, and passengers and/or cargo may be removed from the aircraft after that sequence is completed. If the aircraft has an APU, it will be started during this sequence, or limited electrical and HVAC operation may be available if the aircraft does not have an APU. As described, the clutch configuration described herein allows the engine(s) 10 to be disengaged or declutched from the rotor assembly 12 immediately after landing, and the engine(s) 10 cooled at idle while the rotor assembly 12 stops. Accordingly, full electrical power may be provided to the aircraft with the main rotor 12 stopped while allowing the engine 10 to cool as necessary after landing, i.e., more time may be available for engine cooling than current practice. Further, because stoppage of the rotor assembly 12 occurs immediately rather than after an engine cooldown period and engine shutdown, the passengers and/or cargo may exit more quickly after landing and the safety of "hot refueling" may be improved. Additionally, or alternatively, by allowing the engine(s) 10 to continue to operate between flights without shutdown, the economics of short flights may be improved. Moreover, as described with respect to the engine idle condition illustrated in FIG. 6, the declutched post-landing configuration shown in FIG. 9 may enable electric ground taxi.

The exemplary method 400 and the engine/aircraft conditions or operating modes described in FIGS. 5 through 9 are by way of example only. Other engine/aircraft conditions may arise during an engine cycle, and the engine clutch 104 and inter-spool clutch 122 may be engaged or disengaged to meet the electric power, thrust, or other needs of the operating mode.

As described herein, in exemplary embodiments, the engine clutch 104 may be selectively transitioned between engaged and disengaged positions. It will be appreciated that a controller 116, such as an engine controller for the engine 10 (e.g., a Full Authority Digital Engine Control (FADEC) controller), an aircraft controller, a controller dedicated to the electric power system 106, etc., may be used to facilitate engagement or disengagement of the engine clutch 104. In other embodiments, the inter-spool clutch 122 also may be selectively engaged or disengaged, such that the controller 116 also may be used to facilitate engagement or disengagement of the inter-spool clutch 122. It will be appreciated that the engine clutch 104, and in some embodiments, the inter-spool clutch 122, may include an actuator or actuation system 124 in operative communication with the controller 116 such that signals from the controller 116 may be translated into motion that engages or disengages the respective clutch 104, 122. The actuator 124 for the inter-spool clutch 122 is shown in dashed lines in FIGS. 3A and 3B to indicate that the actuator 124 is for use with alternative embodiments in which the inter-spool clutch 122 is configured for selective engagement or disengagement. In FIGS. 5 through 9, no actuator 124 is illustrated for the inter-spool clutch 122 because the clutch 122 is depicted as a one-way clutch; however, it will be appreciated that, for embodiments in which the inter-spool clutch 122 is selectively engaged/disengaged, an actuator 124 also may be included for the configurations shown in FIGS. 5 through 9. Further, it will be appreciated that, in appropriate embodiments, the actuator 124 may be configured to independently actuate both the engine clutch 104 and the inter-spool clutch 122.

The controller 116 may be configured to receive data indicative of various operating conditions and parameters of the engine 10 during operation of the engine 10. For example, the engine 10 includes one or more sensors 114 configured to sense data indicative of various operating conditions and parameters of the engine 10, such as rotational speeds, temperatures, pressures, vibrations, etc. More specifically, for the exemplary embodiment depicted in FIG. 1, the one or more sensors 114 includes a first sensor 114A configured to sense data indicative of one or more parameters of the rotor assembly 12 (e.g., rotational speed, acceleration, torque on the rotor shaft driving the rotor assembly 12, etc.); a second sensor 114B configured to sense data indicative of the compressors (such as a pressure within the high speed compressor 34, a pressure within the low speed compressor 44, etc.); a third sensor 114C configured to sense data indicative of one or more combustion section parameters (such as a temperature within the combustion section 40, a fuel flow to the combustion section 40, one or more pressures within or around the combustion section 40, etc.), one or more high speed turbine parameters (such as turbine inlet temperature, a rotational speed of the high speed turbine 36, etc.), or both; a fourth sensor 114D operable to sense data indicative of one or more parameters of the low speed system (such as a rotational speed of the low speed spool 45); and a fifth sensor 114E configured to sense data indicative of one or more variable geometry components (such as a position of one or more variable inlet guide vanes, outlet guide vanes, rotor blades 16, guide vanes 20, etc.).

Referring particularly to the operation of the controller 116, in at least certain embodiments, the controller 116 can include one or more computing device(s) 118. The computing device(s) 118 can include one or more processor(s) 118A and one or more memory device(s) 118B. The one or more processor(s) 118A can include any suitable processing device, such as a microprocessor, microcontroller, integrated circuit, logic device, and/or other suitable processing device. The one or more memory device(s) 118B can include one or more computer-readable media, including, but not limited to, non-transitory computer-readable media, RAM, ROM, hard drives, flash drives, and/or other memory devices.

The one or more memory device(s) 118B can store information accessible by the one or more processor(s) 118A, including computer-readable instructions 118C that can be executed by the one or more processor(s) 118A. The instructions 118C can be any set of instructions that when executed by the one or more processor(s) 118A, cause the one or more processor(s) 118A to perform operations. In some embodiments, the instructions 118C can be executed by the one or more processor(s) 118A to cause the one or more processor(s) 118A to perform operations, such as any of the operations and functions for which the controller 116 and/or the computing device(s) 118 are configured, the operations for operating an electric power system 106 (e.g., method 400), as described herein, and/or any other operations or functions of the one or more computing device(s) 118. The instructions 118C can be software written in any suitable programming language or can be implemented in hardware. Additionally, and/or alternatively, the instructions 118C can be executed in logically and/or virtually separate threads on processor(s) 118A. The memory device(s) 118B can further store data 118D that can be accessed by the processor(s) 118A. For example, the data 118D can include data indicative of power flows, data indicative of engine 10 aircraft operating conditions, and/or any other data and/or information described herein.

The computing device(s) 118 can also include a network interface 118E used to communicate, for example, with the other components of the engine 10, the aircraft incorporating the engine 10, the electric power system 106, etc. For example, in the embodiment depicted, as noted above, the engine 10 includes one or more sensors 114 for sensing data indicative of one or more parameters of the engine 10 and various accessory systems, and the electric power system 106 includes an energy storage unit 108 and an electric machine 68 and also may include an auxiliary power unit. The controller 116 is operably coupled to these components through, e.g., the network interface 118E, such that the controller 116 may receive data indicative of various operating parameters sensed by the one or more sensors 114 during operation, various operating conditions of the components, etc., and further may provide commands to control electrical flow of the electric power system 106 and other operating parameters of these systems, e.g., in response to the data sensed by the one or more sensors 114 and other conditions.

The network interface 118E can include any suitable components for interfacing with one or more network(s), including for example, transmitters, receivers, ports, controllers, antennas, and/or other suitable components. For instance, in the embodiment shown, the network interface 118E is configured as a wireless communication network wirelessly in communication with these components (as is indicated by the dashed communication lines in FIG. 1).

The technology discussed herein refers to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

In addition to selectively engaging or disengaging the engine clutch 104 in response to operating conditions, the controller 116 may also be used to provide the functionality of a one-way or overturning clutch through the engine clutch 104. More particularly, the engine clutch 104 and controller 116 may be configured such that the controller 116, in response to, e.g., a signal from the first sensor 114A and/or the fourth sensor 114D, disengages the engine clutch 104 to prevent the rotor assembly 12 or the low speed spool 45 from rotating over a maximum rotational speed. For example, the controller 116 may disengage the engine clutch 104 to allow the rotational speed of the rotor assembly 12 to exceed the speed of the low speed spool 45 during a flight condition. As such, the controller 116 may be configured to selectively disengage the engine clutch 104 regardless of the operating condition to protect the rotor assembly 12 and/or the low speed spool 45 from rotating above a desired maximum rotational speed.

Accordingly, the present subject matter is directed to gas turbine engine shaft architectures and methods of operating aircraft. More particularly, the present subject matter is directed to a turboshaft engine having two clutches, one between a rotor assembly and a low speed spool and the other between the low speed spool and a high speed spool, and an engine accessory gearbox located on the low speed spool. The clutch between the rotor assembly and the low speed spool allows the power turbine output (i.e., the output of a low speed shaft of the low speed spool) to be disconnected from the aircraft (i.e., the rotor assembly or main rotor, which provides thrust to propel the aircraft). The clutch between the low and high speed spools allows a starter-generator or motor-generator connected to the power turbine through the engine accessory gearbox to turn the core rotor (i.e., a high speed shaft of the high speed spool) and start the engine. Thus, the clutch configuration described herein allows the engine to start and operate at idle to high power without turning the main rotor of the aircraft. Further, the clutch configuration described herein allows the starter-generator to be sized up to 100% of engine power, such that the starter-generator is not limited by engine rating or operability. Accordingly, the present subject matter allows a more electric aircraft architecture with engine starter-generators located on the low speed spool able to provide power required for the aircraft up to the engine's maximum rating instead of a fraction of the rated power when core-mounted or located on the high speed spool. That is, the large starter-generator allows the engine to supply more or all of the aircraft's overall electrical power needs. In particular, the clutch configuration described herein allows engines to supply maximum available electrical power in ground operations, without limitations that may be incurred with locked rotor operation. Additionally, the present subject matter facilitates the integration of mechanical and electrical power sources to aircraft propulsion.

Moreover, as described herein, the present subject matter provides for conversion of electricity from an APU or energy storage unit to main rotor mechanical energy via the low speed spool-mounted starter-generator for emergency or other flight conditions, such as when additional engine performance is desired. Further, engines configured as described herein may have improved transient response due to lower core mechanical loading, particularly from variable loads on the core. Additional transient capability also can be used to modify the engine's operating line for increased cycle efficiency. What is more, the accessories gearbox on the low speed spool is a constant speed gearbox, and locating the accessories on a constant speed gearbox allows the accessories to operate at consistent operating conditions, thereby facilitating physical optimization of the components that no longer have to operate across a wide speed range. Other benefits and advantages of the present subject matter may be realized as well.

Further aspects of the invention are provided by the subject matter of the following clauses:

1. A method of operating a gas turbine engine, the method comprising selectively engaging and disengaging an engine clutch disposed between a low speed spool and a rotor assembly of the gas turbine engine, wherein engagement or disengagement of the engine clutch is selected based on an operating condition of an aircraft comprising the gas turbine engine, wherein an inter-spool clutch disposed between the low speed spool and a high speed spool of the gas turbine engine transitions between engaged and disengaged, and wherein the inter-spool clutch disengages when the high speed spool reaches a speed greater than an operational speed of the low speed spool.

2. The method of any preceding clause, wherein when the operating condition is an engine start condition, the engine clutch is disengaged and the inter-spool clutch is engaged.

3. The method of any preceding clause, wherein the gas turbine engine comprises a starter-generator for providing electrical power to and generating electrical power from the gas turbine engine, and wherein the starter-generator provides power to the gas turbine engine during the engine start condition.

4. The method of any preceding clause, wherein when the operating condition is an engine idle condition, the engine clutch is disengaged and the inter-spool clutch is disengaged.

5. The method of any preceding clause, wherein the gas turbine engine comprises a starter-generator for providing electrical power to and generating electrical power from the gas turbine engine, and wherein the starter-generator generates power from the gas turbine engine during the engine idle condition.

6. The method of any preceding clause, wherein when the operating condition is a pre-flight condition, the engine clutch is engaged and the inter-spool clutch is disengaged.

7. The method of any preceding clause, wherein the gas turbine engine comprises a starter-generator for providing electrical power to and generating electrical power from the gas turbine engine, and wherein the starter-generator generates power from the gas turbine engine during the pre-flight condition.

8. The method of any preceding clause, wherein engaging the engine clutch during the pre-flight condition positions the rotor assembly in operative communication with the low speed spool, and wherein the engine clutch is engaged during the pre-flight condition when the low speed spool is rotating at 100% speed.

9. The method of any preceding clause, wherein the engine clutch is configured to allow clutch slippage as the engine clutch transitions from disengaged to engaged.

10. The method of any preceding clause, wherein when the operating condition is a flight condition, the engine clutch is engaged and the inter-spool clutch is disengaged, and wherein the engine clutch is locked into engagement during the flight condition.

11. The method of any preceding clause, wherein the gas turbine engine comprises a starter-generator for providing electrical power to and generating electrical power from the gas turbine engine, and wherein the starter-generator is configured to provide power to and generate power from the gas turbine engine during the flight condition.

12. The method of any preceding clause, wherein when the operating condition is a post-landing condition, the engine clutch is disengaged and the inter-spool clutch is disengaged.

13. The method of any preceding clause, wherein the gas turbine engine comprises a starter-generator for providing electrical power to and generating electrical power from the gas turbine engine, and wherein the starter-generator generates power from the gas turbine engine during the post-landing condition.

14. The method of any preceding clause, wherein engaging the engine clutch positions the low speed spool in operative communication with the rotor assembly.

15. The method of any preceding clause, wherein when engaged, the inter-spool clutch positions the low speed spool in operative communication with the high speed spool.

16. The method of any preceding clause, wherein the inter-spool clutch is selectively engaged and disengaged.

17. A gas turbine engine comprising a low speed spool; a high speed spool; a rotor assembly; an engine clutch disposed between the low speed spool and the rotor assembly; and an inter-spool clutch disposed between the low speed spool and the high speed spool, wherein the engine clutch is configured to selectively position the low speed spool in operative communication with the rotor assembly, and wherein the inter-spool clutch is configured to position the low speed spool in operative communication with the high speed spool.

18. The gas turbine engine of any preceding clause, wherein the engine clutch is a positive engagement device.

19. The gas turbine engine of any preceding clause, wherein the inter-spool clutch is a one-way clutch.

20. The gas turbine engine of any preceding clause, further comprising a positive locking feature to lock the low speed spool in engagement with the rotor assembly.

21. The gas turbine engine of any preceding clause, wherein the low speed spool comprises a low speed compressor, a low speed turbine, and a low speed shaft, wherein the high speed spool comprises a high speed compressor, a high speed turbine, and a high speed shaft, and wherein the low speed spool operates at a lower speed and a lower pressure than the high speed spool.

22. The gas turbine engine of any preceding clause, wherein the inter-spool clutch is configured to selectively position the low speed spool in operative communication with the high speed spool.

23. The gas turbine engine of any preceding clause, further comprising a controller for facilitating engagement or disengagement of the engine clutch.

24. The gas turbine engine of any preceding clause, further comprising an actuator for translating signals from the controller into motion of the engine clutch.

25. The gas turbine engine of any preceding clause, where the controller further facilitates engagement or disengagement of the inter-spool clutch.

26. The gas turbine engine of any preceding clause, further comprising an actuator for translating signals from the controller into motion of the inter-spool clutch.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method of operating a gas turbine engine having an open rotor assembly and a turbomachine including a core, the open rotor assembly including an array of unducted rotor blades and an array of unducted guide vanes, the method comprising:

operating the gas turbine engine within an engine start condition;

disengaging an engine clutch disposed between a low speed spool and the open rotor assembly of the gas turbine engine in response to the engine start condition;

engaging an inter-spool clutch disposed between the low speed spool and a high speed spool of the gas turbine engine in response to the engine start condition;

applying electrical power to an electric machine, wherein the electric machine is mechanically coupled to the low speed spool through an accessory gearbox, to rotate the low speed spool during the engine start condition;

sending power to an accessory system via the low speed spool when the engine clutch is disengaged, wherein the accessory system is mechanically coupled to the accessory gearbox;

operating the gas turbine engine in a post-landing condition subsequent to operating the gas turbine engine in the engine start condition;

disengaging the engine clutch and the inter-spool clutch during the post-landing condition;

with the engine clutch and the inter-spool clutch disengaged during the post-landing condition, decoupling the low speed spool and the open rotor assembly so that the low speed spool rotates freely relative to the open rotor assembly and the open rotor assembly stops rotating; and generating electrical power via the electric machine during the post-landing condition.

2. The method of claim 1, the method further comprising slowing the open rotor assembly using a rotor brake during the post-landing condition.

3. The method of claim 1, the method further comprising:

operating the gas turbine engine in an engine idle condition subsequent to operating the gas turbine engine in the engine start condition;

disengaging the engine clutch and disengaging the inter-spool clutch during the engine idle condition; and transferring power from the gas turbine engine to the electric machine during the engine idle condition.

4. The method of claim 1, the method further comprising:
operating the gas turbine engine in a pre-flight condition subsequent to operating the gas turbine engine in the engine start condition; and
engaging the engine clutch and disengaging the inter-spool clutch during the pre-flight condition.

5. The method of claim 4, wherein the method further comprises transferring mechanical power from the gas turbine engine to the electric machine during the pre-flight condition.

6. The method of claim 1, the method further comprising:
operating the gas turbine engine in a flight condition subsequent to operating the gas turbine engine in the engine start condition, wherein the engine clutch is engaged and the inter- spool clutch is disengaged during the flight condition; and
locking the engine clutch into engagement during the flight condition.

7. The method of claim 6, further comprising receiving power from an auxiliary power unit or energy storage unit in the in the event of engine failure.

8. The method of claim 1, wherein the method includes generating power via the electric machine during the post-landing condition.

9. The method of claim 1, wherein engaging the engine clutch positions the low speed spool in operative communication with the open rotor assembly.

10. The method of claim 1, wherein when engaged, the inter-spool clutch positions the low speed spool in operative communication with the high speed spool.

11. The method of claim 1, further comprising receiving power from the electric machine via the low speed shaft when the engine clutch is engaged.

* * * * *